Patented June 6, 1944

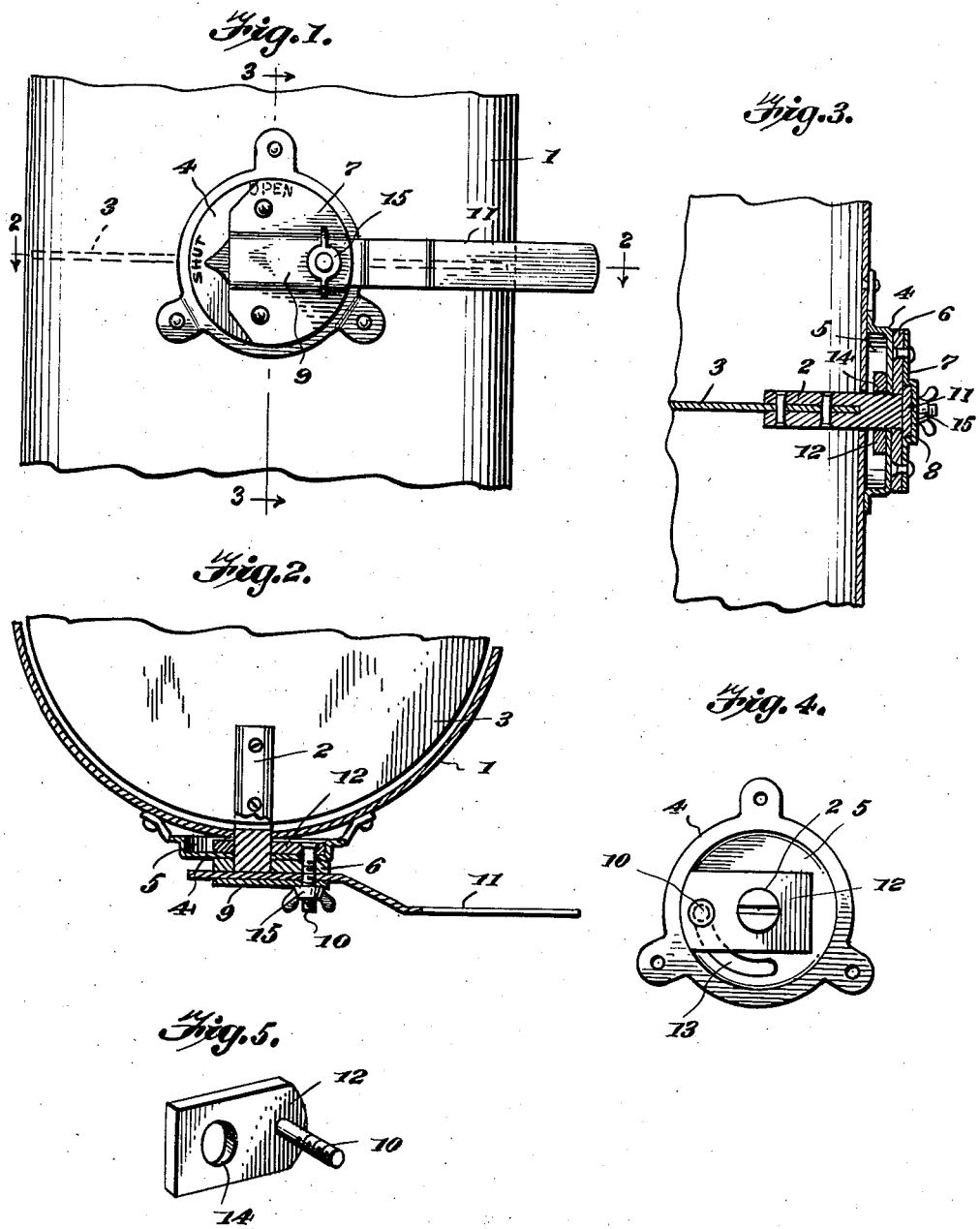

2,350,441

UNITED STATES PATENT OFFICE 2,350,441

DIAL DAMPER REGULATOR

Evald Anderson, North Quincy, Mass.

Application December 11, 1942, Serial No. 468,714

2 Claims. (Cl. 74—531)

The present invention is directed to improvements in dial damper regulators, and is an improvement of my co-pending application Serial Number 457,184, filed September 3, 1942.

The primary object of the invention is to provide a device of this character so constructed that the damper can be quickly manipulated for adjustment and positively held in any of its adjusted positions.

Another object of the invention is to provide a device of this nature especially adapted for use in connection with the ventilating pipes of ships, the construction being such that accurate adjustments can be made in a practical manner, and the damper held firmly in its selected positions of adjustments and against accidental release due to the movement of the ship so equipped.

Another object of the invention is to provide a device of this kind adapted to be attached to the pipe in a simple and secure manner.

Still another object of the invention is to provide a regulator wherein adjustment of the damper can be made quickly, and during the adjusting operation the movable parts will travel evenly and smoothly, thereby preventing any possibility of the parts becoming canted during adjustment.

Still other objects and advantages of the invention will appear and be better understood from the embodiment of the invention of which the following specification will set forth more fully the details of construction, and in which reference is had to the accompanying drawing, in which:

Figure 1 is a side elevation of the device.

Figure 2 is a sectional view on line 2—2 of Figure 1.

Figure 3 is a sectional view on line 3—3 of Figure 1.

Figure 4 is a rear elevation.

Figure 5 is a perspective view of the stud bearing plate.

Referring to the drawing, 1 designates a section of a ventilating pipe or the like, and 2 the shaft to which the damper disk 3 is fixed, said shaft being rotatable in the pipe, as customary.

The handle mounting comprises a plate 4 for attachment to the pipe 1 in any approved manner, said plate being pressed outwardly to provide a chamber 5, the purpose of which will appear later.

A bearing plate 6 is provided and is rotatable on the plate 4, and to this plate is suitably fixed the outer end of the shaft 2.

Fixed to the plate 6 is a handle securing plate 7, said plate having a housing 8 pressed therein to provide an elongated socket 9.

The shank of the clamping stud 10 passes through the plates 4, 6 and housing 8, and also through the handle 11 fitted in the socket 9, as in the aforementioned application.

The stud has its inner end suitably fixed adjacent the outer end of the metal plate 12 of relatively large area, said stud being movable in an arcuate slot 13 formed in the plate 4, the ends of which limit the movement of the stud.

The plate 12 has formed adjacent its inner end a bearing 14, and in which the shaft 2 is engaged. The bearing 14 is of such size as to receive the shaft freely, but the thickness of the plate is such that undue wobbling of the plate at the point of bearing on the shaft 2 is positively prevented.

The depth of the chamber 5 is such that the plate 12 may freely move therein during adjustment, and at which time it will be guided in its travel on the inner face of the plate 4.

Mounted on the stud 10 is a wing-nut 15, which when manipulated inwardly will bear against the top of the housing 8 and draw the plate 12 into firm engagement with the inner face of the plate 4, thus firmly locking the damper in a selected adjusted position.

In actual practice it has been found that it is only necessary to move the wing-nut a slight degree to cause the plate 12 to firmly clamp against the inner face of the plate 4, thus firmly locking the damper in adjusted position with very slight effort, reverse manipulation of the wing-nut serving to quickly release the plate 12 to permit re-adjustment of the damper, when desired.

Briefly the operation is as follows:

When it is desired to adjust the damper disk 3 it is only necessary to unscrew the wing-nut to a slight degree, whereupon the plate 12 will move from tight engagement with the plate 4 to permit the handle mounting to be swung through the medium of the handle 11, which action will obviously rotate the plate 6 and thus the shaft 2 and the damper disk 3 to a selected position of adjustment. Since the stud 10 is slidable in the groove 13 various positions of adjustment can be obtained.

It will be noted that the plate 12, when released upon manipulating the wing-nut 15 will still have rubbing contact with the plate 4 during adjustment, thus preventing tilting or wobbling of the same during movement thereof. Thus it will be seen that while the adjustment is sensitive the parts will be tightly retained in their adjusted positions, which is due to the fact that the confronting faces of the plates 4 and 12 when in tight frictional engagement will firmly hold the shaft 2 against accidental rotation. This is due to the fact that the frictional engaging areas of the plates 4 and 12 are relatively large, and upon slight movement of the wing-nut 15 to its clamping position will move the plates 4 and 12 into tight frictional engagement, thus positively preventing accidental movement of the handle mounting, and assuring that after an adjustment has been made the parts will remain firmly in their adjusted positions.

What is claimed is:

1. A device of the class described comprising a plate adapted to be mounted on a housing having a shaft extending therethrough and having an arcuate slot formed therein, a handle mounting adapted to be fixed to the shaft, an elongated clamping plate engaged at its inner end on the shaft, a stud carried by the outer end of the clamping plate and movable in said slot, said stud being connected with the handle mounting, and a nut on the stud adapted to engage the handle mounting to draw the clamping plate into tight frictional engagement with the first named plate.

2. A device of the class described comprising a plate adapted to be mounted on a housing having a shaft extending therefrom, and having an arcuate slot formed therein, said plate having a chamber therein, a handle mounting movable on the plate and fixed to the shaft, an elongated clamping plate having its inner end engaged on the shaft for swinging movement in the chamber, a stud fixed to the outer end of the clamping plate and movable in said slot, said stud passing through the handle mounting, and a nut on the stud for binding engagement with the handle mounting to draw the clamping plate and handle mounting into tight frictional engagement with the first named plate.

EVALD ANDERSON.